US012624175B2

(12) United States Patent
Burnell

(10) Patent No.: US 12,624,175 B2
(45) Date of Patent: May 12, 2026

(54) REINFORCEMENT MATERIAL FOR COMPOSITE LAMINATE

(71) Applicant: PRF Composite Holdings Limited, Dorset (GB)

(72) Inventor: Robert Burnell, Dorset (GB)

(73) Assignee: PRF Composite Holdings Limited, Dorset (GB)

( * ) Notice: Subject to any disclaimer, the term of this patent is extended or adjusted under 35 U.S.C. 154(b) by 317 days.

(21) Appl. No.: 18/298,107

(22) Filed: Apr. 10, 2023

(65) Prior Publication Data

US 2023/0323054 A1    Oct. 12, 2023

(30) Foreign Application Priority Data

Apr. 11, 2022    (GB) ...................................... 2205270
Nov. 17, 2022    (GB) ...................................... 2217233

(51) Int. Cl.
*C08J 5/24*         (2006.01)
*B32B 5/02*        (2006.01)
*B32B 5/26*        (2006.01)

(52) U.S. Cl.
CPC ................. *C08J 5/24* (2013.01); *B32B 5/024* (2013.01); *B32B 5/263* (2021.05); *B32B 2262/148* (2021.05)

(58) Field of Classification Search
None
See application file for complete search history.

(56) References Cited

U.S. PATENT DOCUMENTS

| | | | | |
|---|---|---|---|---|
| 5,198,281 | A | * | 3/1993 | Muzzy .................. D06M 23/08 |
| | | | | 156/308.2 |
| 5,409,767 | A | * | 4/1995 | Trudeau .................. B29C 70/44 |
| | | | | 442/59 |
| 2013/0219600 | A1 | * | 8/2013 | Atorrasagasti ........... B32B 5/08 |
| | | | | 2/463 |
| 2014/0087616 | A1 | * | 3/2014 | Adams ..................... C08J 5/248 |
| | | | | 442/149 |
| 2016/0039172 | A1 | * | 2/2016 | Kawka .................. B32B 27/286 |
| | | | | 442/244 |

(Continued)

FOREIGN PATENT DOCUMENTS

| | | |
|---|---|---|
| CN | 210458024 U | 11/2020 |
| CN | 114179462 A | 3/2022 |
| EP | 0595384 A1 | 5/1994 |

(Continued)

OTHER PUBLICATIONS

Search Report issued in counterpart UK Patent Application No. GB2205270.8, mailed Oct. 6, 2022.

(Continued)

*Primary Examiner* — Abbas Rashid
*Assistant Examiner* — Adrianna N Konves
(74) *Attorney, Agent, or Firm* — Kim IP Law Group LLC

(57)            ABSTRACT

A woven fabric prepreg for constructing a composite laminate comprises two sheets of fabric woven from tows of fibres, impregnated with a polymer matrix and adhered together. Each sheet is woven in a satin weave such that the tows create long floats on at least one side of the sheet. The sheets are positioned face-to-face with the long floats parallel, such that the tows pack together and the space between the sheets is minimised.

15 Claims, 12 Drawing Sheets

(56)          References Cited

U.S. PATENT DOCUMENTS

2019/0084252 A1 *   3/2019  Hochstetter ............. B29C 70/08

FOREIGN PATENT DOCUMENTS

| | | | |
|---|---|---|---|
| EP | 3797956 | A1 | 3/2021 |
| JP | 2001055642 | A | 2/2001 |
| WO | 2013110111 | A1 | 8/2013 |
| WO | 2014100543 | A1 | 6/2014 |

OTHER PUBLICATIONS

European Search Report in counterpart European U.S. Appl. No. 23/166,214, mailed Sep. 14, 2023.
Search Report in counterpart UK Patent Application No. GB2217233. 2, mailed May 16, 2023.
United Kingdom Intellectual Property Office, Combined Search and Examination report in counterpart application No. 2317149.9 issued Jan. 9, 2024.
European Patent Office, Search report issued in related European Patent Application No. 25152954.1, dated Apr. 25, 2025.
United Kingdom Intellectual Property Office, Search Report issued in related United Kingdom Application No. 2419106.6, dated Apr. 7, 2025.

* cited by examiner

REINFORCEMENT MATERIAL FOR COMPOSITE LAMINATE

TECHNICAL FIELD

The present invention relates to a woven multi-layer fabric prepreg for use in constructing a composite laminate, a method of manufacturing a woven multi-layer fabric prepreg, and a method of manufacturing a composite laminate.

BACKGROUND OF THE INVENTION

Composite laminates of reinforced materials are often used to make strong yet lightweight components. Such components are used in many industries, such as the automotive, aerospace and electricity generation industries. Additionally, they may be used for personal items such as body armour or sporting goods. A reinforcement material is typically a mix of fibres and a polymer matrix. Common fibres are carbon fibre, glass fibre, or natural fibres such as flax and hemp. The polymer matrix is often a resin, such as epoxy, phenolic, bismaleimide, or cyanate ester. The reinforcement fibres are commonly either laid uni-directionally or woven, depending upon the desired result. A component that requires strength in all directions is often made using woven reinforcement material.

One method of creating a composite laminate is by layering sheets of reinforcement material over a pattern or in a mould before curing. The polymer matrix may be added separately, but for the best results the reinforcement material is pre-impregnated with the polymer matrix. Sheets of pre-impregnated material are referred to as prepregs.

Creating a composite laminate is time-consuming, as each layer of prepreg must be cut to size and shape before being laid on, ensuring intimate contact with the surface of the pattern or mould. Using a thicker prepreg requires fewer layers to be used, which therefore speeds the process up. However, it is difficult to impregnate thicker fabric sufficiently, and typically there will be a lot of dry fibre in the material, and therefore a lot of enclosed free space in which air can be trapped. The air needs to be removed regularly using a debulking process carried out under vacuum. Thus, using a thicker fabric does not necessarily reduce the time to create a composite laminate. In addition, thicker fabrics can be difficult to work with for complex forms, as they are stiffer and have less drape.

BRIEF SUMMARY OF THE INVENTION

According to a first aspect of the present invention, there is provided a method of manufacturing a woven multi-layer fabric prepreg for use in constructing a composite laminate, comprising the steps of: providing two sheets of woven fabric using tows of fibres in a satin weave, such that said tows create long floats on each side of each sheet, each sheet being elongate and having a longitudinal direction; impregnating each sheet of fabric with a polymer matrix;

placing the sheets together face-to-face or back-to-back with the long floats parallel, such that the tows pack together and enclosed free space between the sheets is minimised, and so that the longitudinal directions are aligned; and adhering said sheets together to form the woven multi-layer fabric prepreg.

By providing an elongate sheet, the multi-layer fabric prepreg can be constructed in a quicker and more cost-effective manner. This is compared to if square sheets of fabric are used, with one sheet being rotated to provide the parallel long float formation.

Since the enclosed free space between the sheets is minimised by the long floats nesting, the requirement for debulking is reduced or eliminated. The more delicate satin weaves are chosen for their improved drapability whilst maintaining good, improved handling of the fabric.

A fabric prepreg formed in such a manner is balanced, which allows for it to be used in a straightforward manner.

The face of the sheet may be referred to as the warp side, and the back of the sheet may be referred to as the weft side. The face or warp side has long floats aligned with the longitudinal direction, and the back or weft side has long floats aligned in an orthogonal direction. It will be appreciated the term of "face-to-face" and "back-to-back" may equate to "warp-side-to-warp-side" and "weft-side-to-weft-side" respectively.

Preferably, the method may further comprise cutting the woven multi-layer fabric prepreg into pieces. Advantageously, the woven multi-layer fabric prepreg may be elongate and said cutting may occur in a direction transverse to a longitudinal direction of the woven multi-layer fabric prepreg.

Since the sheets are long, the resulting multi-layer fabric prepreg is also long, and therefore the multi-layer fabric prepreg may be cut into pieces or strips to allow easier use thereof.

The prepreg is preferably cut automatically and continuously on a conveyorised computer numerical control (CNC) machine. Before cutting, it will be appreciated that the fabric prepreg may be wound onto a roll, so as to allow for more convenient transportation.

Advantageously, at least one of the two sheets of fabric may be provided on a roll. Both sheets are preferably provided on separate rolls. This allows for more convenient storage and use of the elongate sheets.

Beneficially, at least one of the two sheets of fabric may be greater than 100 m long. Such a length is convenient for processing. Particularly, the sheets of fabric may be between 100 m and 200 m long.

In a preferable embodiment, a face of one of said sheets may be impregnated with the polymer matrix and a back of one of said sheets may be impregnated with the polymer matrix. In other words, a warp-side of one sheet may be impregnated and a weft-side of one sheet may be impregnated. Since the sheets are then positioned "face-to-face", "back-to-back", "warp-side-to-warp-side", or "weft-side-to-weft-side", polymer matrix is positioned in between the two sheets.

Preferably, each sheet may have a fabric weight of between 60 gsm (grams per square meter, or g/m$^2$) and 1500 gsm so that the woven multi-layer fabric prepreg has a fabric weight of between 120 gsm and 3000 gsm. The prepreg may be suitable for use in the formation of tools or components. The fabric weight of the sheet and of the prepreg may be defined as the weight of the fabric per unit of area and excluding the weight of the polymer matrix. A narrower fabric weight range of between 150 gsm and 1000 gsm may also be considered.

Optionally and particularly for tooling bulk plies, each sheet may have a fabric weight of over 500 gsm so that the woven multi-layer fabric prepreg has a fabric weight of over 1000 gsm. Fabric of a fabric weight over 1000 gsm is difficult to impregnate fully, and so such fabric is particularly suited to a multi-layer formation to provide good polymer impregnation.

Additionally and particularly for tooling bulk plies, each sheet may have a fabric weight of between 500 gsm and 525 gsm so that the woven multi-layer fabric prepreg has a fabric weight of between 1000 and 1050 gsm. As such, it is possible to provide a woven multi-layer fabric prepreg having a fabric weight of around 1032 gsm.

Preferably, the satin weave may be a four, five, or eight harness satin weave.

According to a second aspect of the invention, there is provided a method of manufacturing a composite laminate, comprising the steps of: obtaining a pattern or a mould; obtaining a first woven multi-layer fabric prepreg manufactured using the method according to a first aspect of the invention; creating a laminate by placing a plurality of layers of said first fabric prepreg onto said pattern or into said mould; and curing said laminate using heat.

Preferably, the method further comprises the step of: obtaining a second woven fabric prepreg, said second fabric prepreg having a lower fabric weight than said first fabric prepreg; and wherein said step of creating a laminate further comprises the step of placing a layer of said second fabric prepreg before said layers of said first fabric prepreg.

Advantageously, a single debulking may occur after placement of the second fabric prepreg and one layer of the first fabric prepreg. Less debulking allows for manufacture in a quicker and more cost-effective manner.

Beneficially, the method may further comprise the step of obtaining a further said second woven fabric prepreg and said step of creating a laminate further comprises the step of placing a layer of said second fabric after said layers of said first fabric prepreg.

In a preferable embodiment, there may be an odd number of layers of the first fabric prepreg.

Additionally, there are five layers of the first fabric prepreg. However, there may be more or less, provided there is an odd number to ensure a balanced laminate.

Optionally, said layers of said first fabric prepreg are placed such that the tows of adjacent layers are neither parallel nor orthogonal to each other According to a third aspect of the invention, there is provided a woven fabric for constructing a composite laminate, comprising two sheets of fabric woven from tows of fibres, impregnated with a polymer matrix and adhered together; wherein: each sheet is woven in a satin weave such that said tows create long floats on at least one side of the sheet; and said sheets are positioned face-to-face or back-to-back with the long floats parallel, such that the tows pack or nest together and the space between the sheets is minimised.

Preferably, said sheets may be adhered together by said polymer matrix.

Beneficially, said satin weave may be a four-harness, five-harness, or eight harness satin weave.

In a preferable embodiment each sheet may have an area density of between 60 g/m$^2$ and 1500 g/m$^2$.

Optionally, said polymer matrix may be epoxy resin.

Additionally, said fibres may be one of the following: a. carbon fibres; b. glass fibres; or c. natural fibres.

According to a fourth aspect of the invention, there is provided a method of manufacturing a woven fabric for constructing a composite laminate, comprising the steps of: weaving two sheets of fabric using tows of fibres in a satin weave, such that said tows create long floats on at least one side of each sheet; impregnating each sheet of fabric with a polymer matrix; placing the sheets together face-to-face or back-to-back with the long floats parallel, such that the tows pack together and the space or enclosed free space between the sheets is minimised; and adhering said sheets together.

Preferably, said step of adhering said sheets together may comprise the step of heating the polymer matrix in both sheets and then allowing it to cool.

Advantageously, said sheets may be woven using a five-harness satin weave.

Beneficially, each sheet may have an area density of between 60 g/m$^2$ and 1500 g/m$^2$.

Optionally, said polymer matrix may be an epoxy resin.

Additionally, said fibres may be one of the following: a. carbon fibres; b. glass fibres; or c. natural fibres.

According to a fifth aspect of the invention, there is provided a method of manufacturing a composite laminate, comprising the steps of: obtaining a pattern or a mould; obtaining a first woven fabric manufactured using the method according to the fourth aspect of the invention; creating a laminate by placing a plurality of layers of said first fabric onto said pattern or into said mould; and curing said laminate using heat.

Preferably, said layers of said first fabric may be placed such that the tows of adjacent layers are neither parallel nor orthogonal to each other.

Beneficially, the method of manufacturing a composite laminate may further comprise the step of: obtaining a second woven fabric, said second fabric having a lower area density than said first fabric; and wherein said step of creating a laminate further comprises the step of placing a layer of said second fabric before said layers of said first fabric.

Advantageously said second fabric may be woven in a twill weave.

Beneficially, said second fabric may be a spread tow fabric.

Optionally, said second fabric may have an area density of less than 195 g/m$^2$ or less than 210 g/m$^2$.

Preferably, said second fabric may have an additional coating of said polymer matrix on one side. Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

Figure 1:
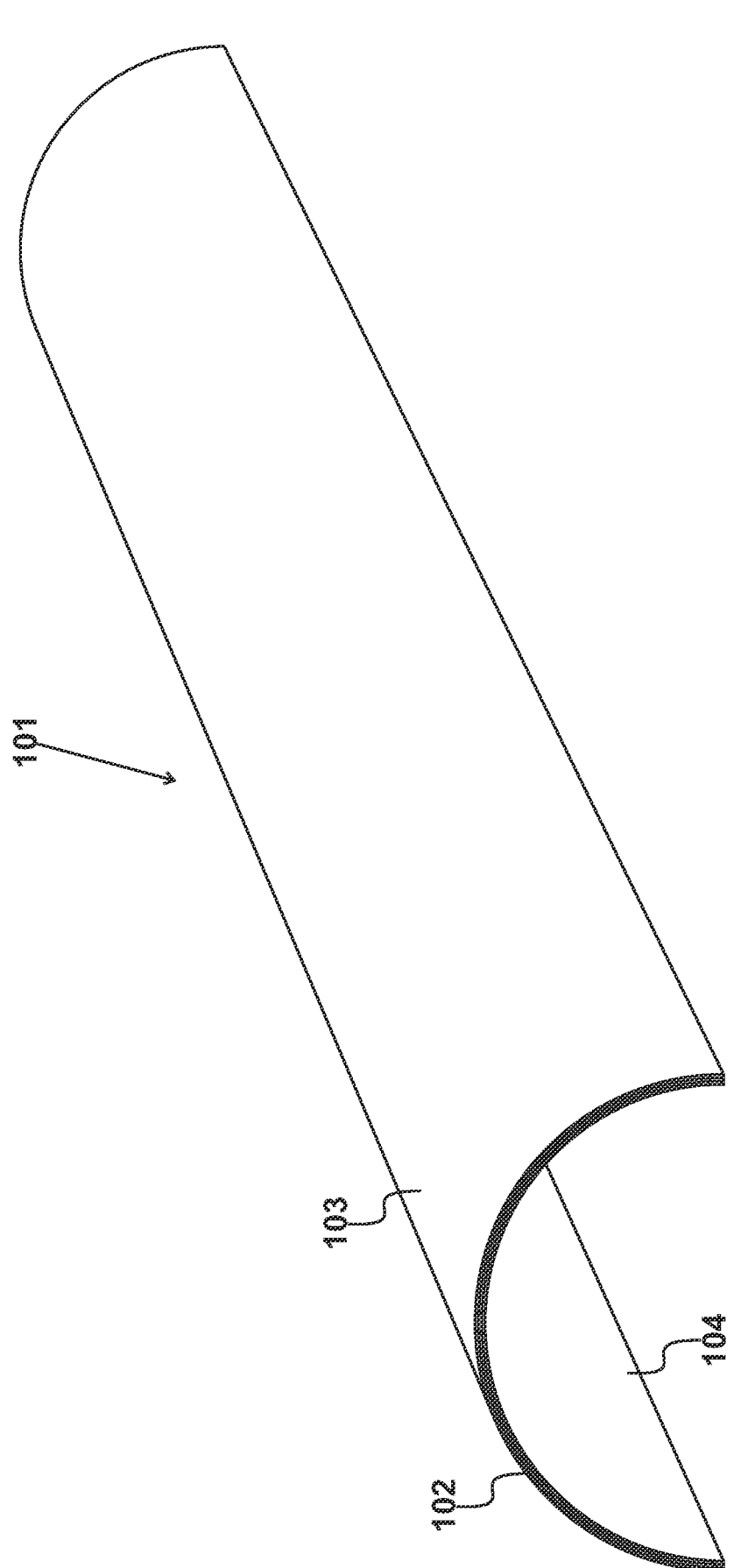
FIG. 1 illustrates a composite carbon-fibre component.

FIG. 1 illustrates a composite carbon-fibre component, made using a laminating process. Component 101 has a hemicylindrical shape, and is designed to be fixed to a similar component to create a cylindrical duct or pipe. It is approximately 10 cm wide and the wall thickness is around 2 mm.

It will be understood that this example component is simple for ease of illustration; composite components can be extremely complicated, and the materials and methods described herein can be used to make a component of any shape and size.

Component 101 comprises several layers 102 of reinforcement material, shown diagrammatically at the edge. These have been layered on in the form of prepregs, as will be further described with reference to FIG. 5.

Component 101 has an outer surface 103, whose shape is defined by the mould in which the component was made, and an inner surface 104, whose shape is defined by the number of layers in the laminate and the way in which they were laid on. For example, a component with a thicker wall can be made by adding more layers.

Figure 2:
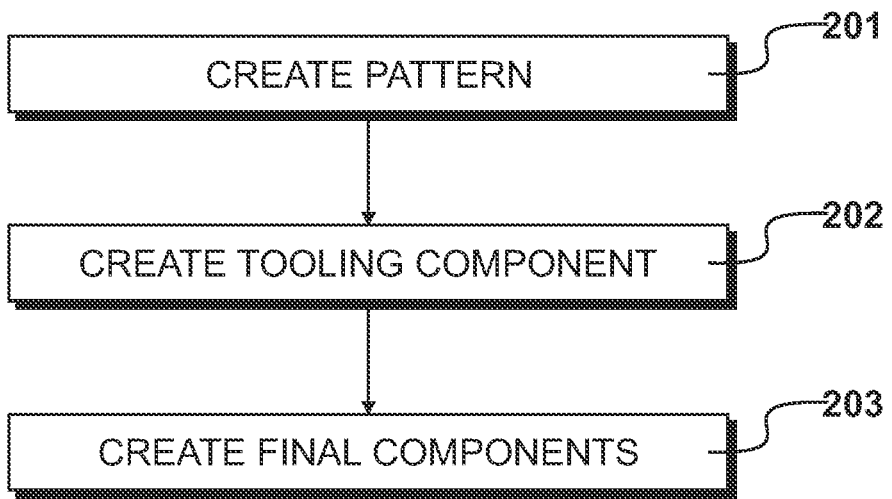
FIG. 2 details steps taken to manufacture the component shown in FIG. 1.

FIG. 2 details steps that are taken in the manufacturing process to create component 101. At step 201 a solid pattern is created, usually by machining a suitable material. For example, for a carbon-fibre component, epoxy tooling board is frequently used. At step 202 a tooling component or mould is created from the pattern, and at step 203 the final component 101 is created using this mould.

This is a standard procedure used for many methods of casting. A specific consideration for manufacturing composite laminates using this method is that in order to be able to create components quickly, they need to be cured at a high temperature. However, if the mould is made of a different material from the component, then the difference in expansion coefficients may create distortion and stress within the component and reduce dimensional accuracy. Therefore, the tooling component is generally made of the same material as the final component.

The tooling component and the final component are made in the same way, by creating a composite laminate of prepregs. The difference between the two types of component is in the number of layers used and the weight of the prepregs.

Prepregs can be manufactured in varying weights, and may be suitable for making either tooling or final components. The specific prepregs forming part of the invention will be described with reference to FIGS. 6 to 10.

Figure 3:
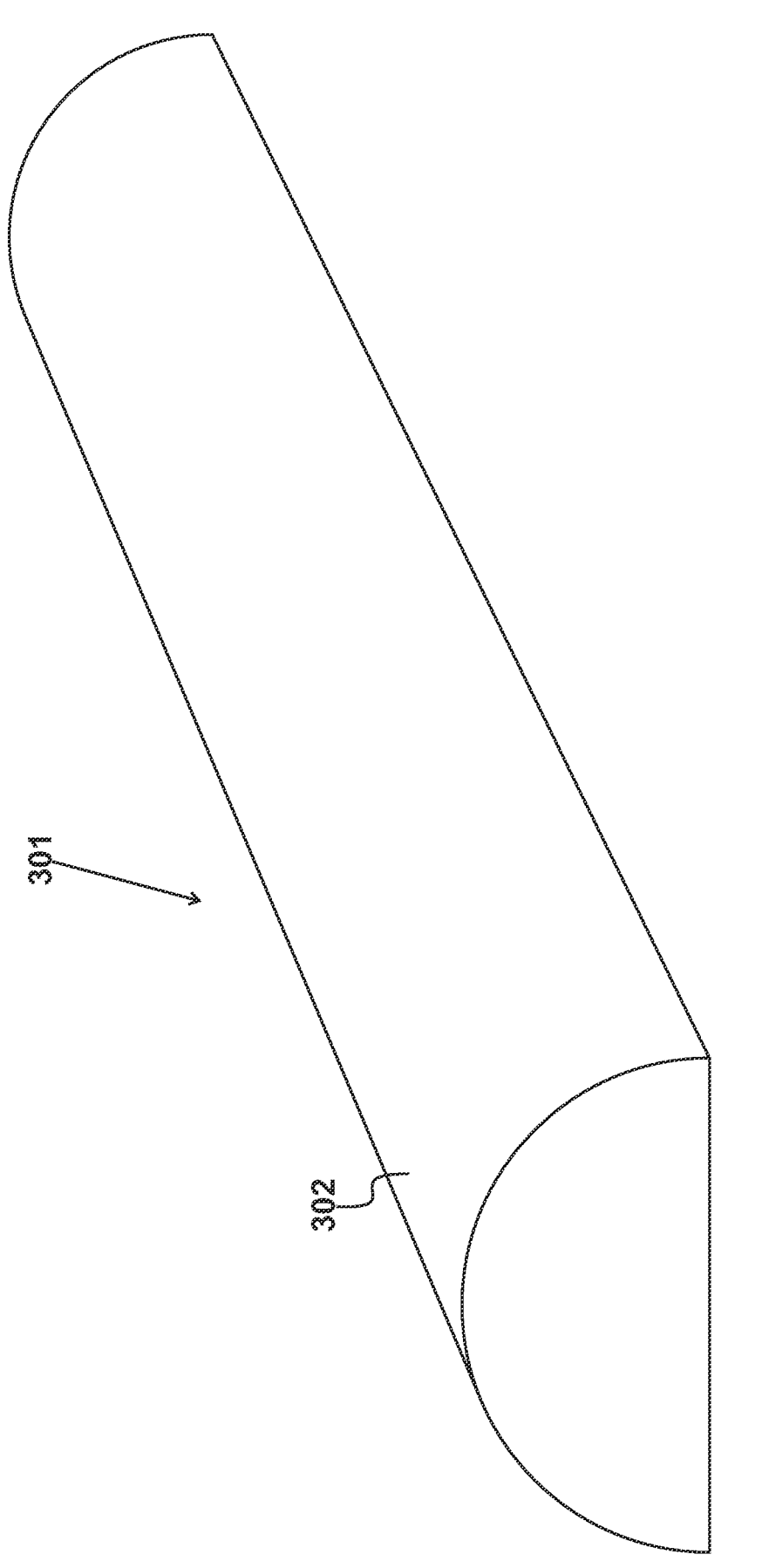
FIG. 3 illustrates a pattern used to manufacture the component shown in FIG. 1.

FIG. 3 illustrates pattern 301 that is used in the construction of component 101. It is a solid pattern machined from epoxy tooling board, and its top surface 302 has the shape required by the top surface 103 of component 101.

Figure 4:
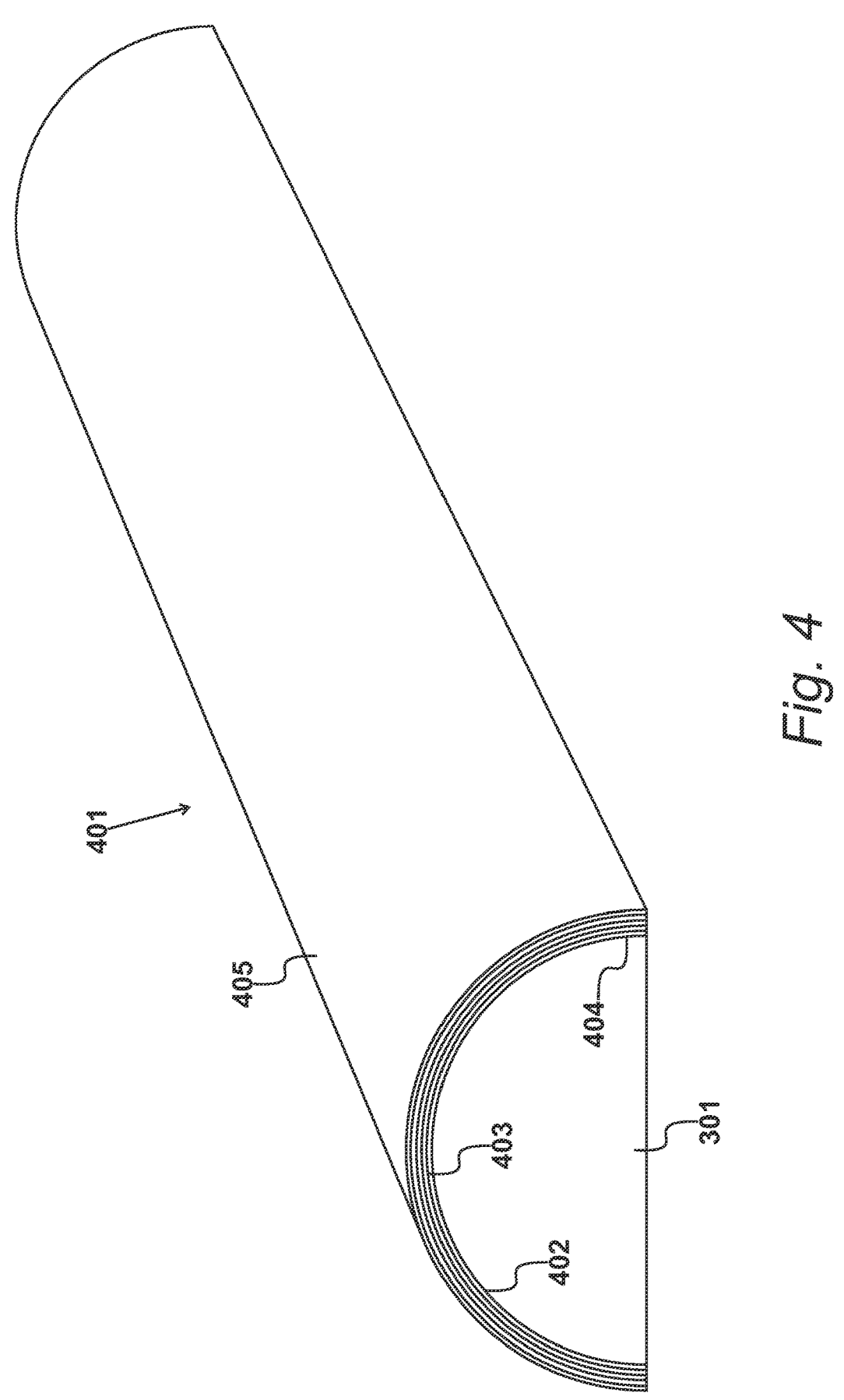
FIG. 4 illustrates a mould being constructed on the pattern shown in FIG. 3.

FIG. 4 illustrates pattern 301 with mould 401 constructed on top of it. Mould 401 is a composite carbon-fibre tooling component constructed by placing a number of layers, including layers 402 and 403 (shown diagrammatically), of prepreg onto pattern 301. When complete, mould 401 has an inner surface 404 and an outer surface 405. Inner surface 404 is the negative shape of top surface 302 of pattern 301, and therefore of the outer surface 103 of component 101.

The composite laminate is constructed as follows. First a layer of thin surface ply prepreg is laid on, which in this embodiment has a weight of 185 g/m$^2$. This creates the smooth inner surface 404. The surface ply fabric 402 used for this layer will be described further with reference to FIG. 10.

Five layers of bulk ply prepreg are then laid on. In this embodiment, each bulk ply layer has a weight of 1020 g/m$^2$. The bulk ply fabric 403 used for these layers will be described further with reference to FIGS. 6 to 9. A final layer of surface ply is then added. A single debulking operation is carried out after the first layer of bulk ply, as will be described further with reference to FIG. 5.

Once the composite laminate is complete, mould 401 is cured under heat and pressure. A preferred method of curing is to place mould 401 and pattern 301 in a vacuum bag, pulling the vacuum from the bag, and then placing it into an autoclave. Before the vacuum bag is placed in the autoclave, a vacuum drop test may be conducted to ensure the vacuum integrity.

The autoclave applies a vacuum to the vacuum bag, pressurises the vessel to typically 6 bar [600 kPa], and heats the air around it. A typical curing process for a tooling prepreg would be 8-12 hours at around 45° C. At this temperature, any difference between the expansion coefficients of the carbon in mould 401 and the tooling board from which pattern 301 is made is negligible.

Mould 401 is then removed from pattern 301 and is placed in an oven for post-curing. In this process the temperature is ramped up gradually over around twenty hours from about 50° C. to 195° C. This causes full cross-linking of the resin while gradually increasing the glass transition temperature, but not exceeding it which would cause the resin to become rubbery. Mould 401 is then ready to be used to make component 101 and hundreds of identical components.

Other methods of curing and post-curing can be used, and the choice is often dependent upon the polymer matrix chosen.

Once cured, the wall of mould 401 is typically around 6 mm thick. This thickness generally provides enough strength and solidity to be used as a tooling component. However, depending upon requirements, a tooling component could be thinner or thicker.

Figure 5:
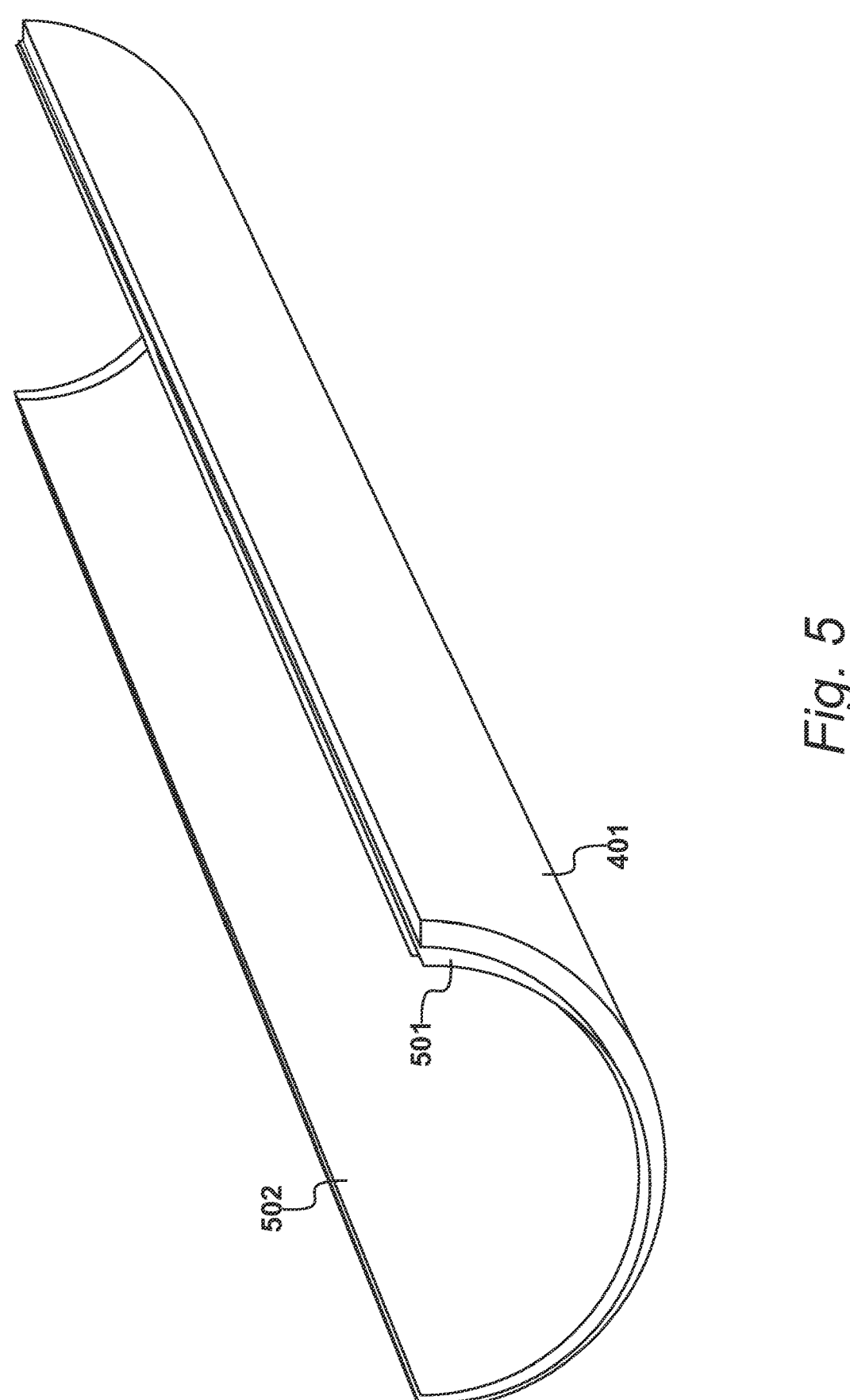
FIG. 5 illustrates layers being placed on the mould shown in FIG. 4.

FIG. 5 illustrates a first layer and second layer of a composite laminate being laid inside mould 401, in order to construct component 101. Component 101 comprises a plurality of layers 102 of prepreg. Generally these layers are thinner and not as many of them are required as for mould 401. The number of layers will depend on the strength, thickness, and weight requirements of the final component. In this example, a first layer of visible grade prepreg 501 forms outer surface 103 of component 101. This is followed by a second layer of a 400 g/m$^2$ prepreg 502. Two further layers of 400 g/m$^2$ will be added to finish the laminate. The 400 g/m$^2$ prepreg 502 is formed in the same way as bulk ply fabric 403, which will be described with reference to FIGS. 6 to 9.

As shown in FIG. 5, layers 501 and 502 are not exactly the same size as mould 401 and overlap it at the edge. The final component 101 will be machined to remove these inaccuracies. A similar process may be required for mould 401, although in that case the edge inaccuracies may be acceptable.

Once the layering of component 101 is complete, component 101 and mould 401 are placed in a vacuum bag inside an autoclave. The autoclave applies pressure and heat, and component 101 is cured by ramping up to a temperature of around 120° C. to 130° C. over one hour. It is possible to cure at this higher temperature because mould 401 and component 101 are made of the same materials and therefore have the same expansion coefficients.

Depending on the requirements for the component, it may then be post-cured in an oven ramped up to around 190° C. over a period of time. A component that will be subjected to high temperature, such as in a racing car, may need to be post-cured. However, a component that will not be subjected to heat or does not need to be quite so strong may not require post-curing.

Again, other methods of curing and post-curing may be used.

When laying up mould 401 or component 101, it is usually necessary to debulk the layers at one or more points during the process by placing the unfinished composite laminate and the pattern or mould in a vacuum bag, and operating a vacuum pump for at least fifteen minutes. This pulls the laminate onto the pattern or mould, improves consolidation of the resin throughout the layers, and removes air from the laminate.

If a composite laminate is not sufficiently debulked and air remains within it, then voids may be formed within the resin in the finished product, which reduce the component's strength. In addition, there may be surface pinholing, or inclusions, which occur when air migrates outwards during curing from free space within the laminate stack. These inclusions are not generally acceptable on the inner surface of a tooling component, because they will create corresponding imperfections in the outer surface of the final component.

Figure 6:
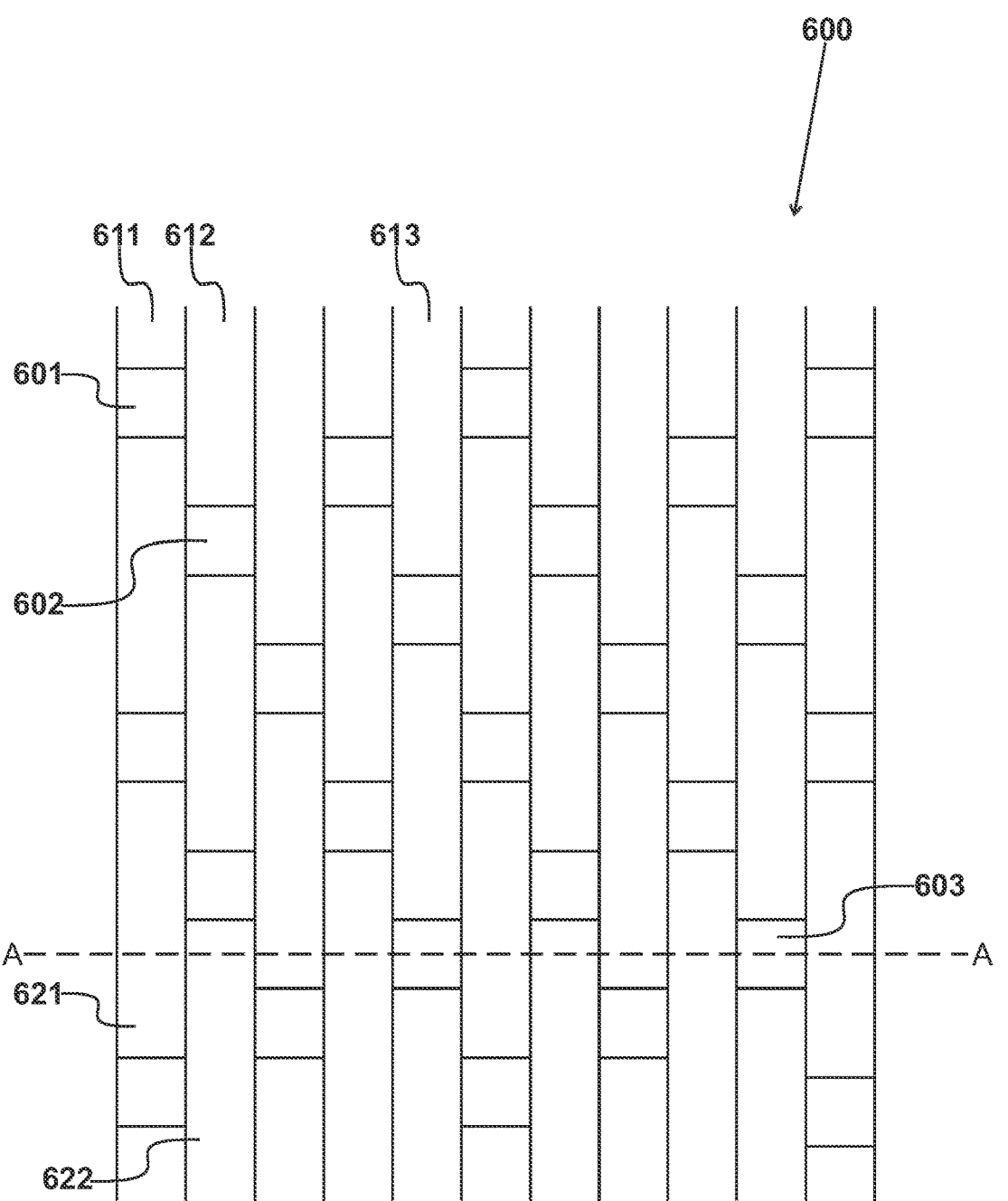
FIG. 6 shows a plan view of part of a sheet of fabric forming part of the mould shown in FIG. 4.

FIG. 6 shows a plan view of part of a sheet of fabric 600 used to create bulk ply prepreg 403. A cross-section across line A-A will be illustrated in FIG. 7. Bulk ply 403 is a woven multi-layer fabric pre-impregnated with a polymer matrix. In this example, the fabric is woven from carbon-fibre tows, but it could also be made from tows of any other suitable fibre, such as glass-fibre or natural fibres such as flax or hemp. In this example, the polymer matrix is epoxy resin, but it could be any other suitable resin or other matrix.

The fabric is woven by passing wefts, such as wefts 601, 602 and 603, over and under a number of warps, such as warps 611, 612 and 613. The wefts are usually formed from a single tow being passed in one direction and then the other. Each weft and warp is, in this example, a 12K carbon-fibre tow that is a bundle of around 12,000 carbon-fibre filaments. FIG. 6 illustrates a part only of the fabric; the entire fabric sheet 600 is much larger.

The fabric is a satin weave, meaning that each weft goes under a number of warps and then over a single warp. In this example it is five-harness satin weave, which goes under four warps, but other variations of satin weave could be used. Wherever the weft goes under the warps, long parallel floats are created, such as floats 621 and 622.

Once the fabric is woven it is pre-impregnated with epoxy resin. Typical methods of pre-impregnating sheets of fibres include the hot melt method and the solution dip method. In a hot melt system, a resin film is cast onto a carrier, typically a coated industrial paper. The fabric and film are passed through heated rollers which heat the resin, transfer the resin to the fabric, and force partial impregnation of the resin into the fibre web, from the paper upwards. This method can leave a lot of dry fibre in the fabric, depending on how thick it is. The pressure of the rollers consolidates the resin in the fabric and also spreads and flattens the tows, which improves fibre packing and reduces the amount of enclosed free space for air.

Before pre-impregnation, the area density (also referred to as the weight) of fabric sheet 600 is 510 g/m$^2$. This sheet could be used as a prepreg. Satin weave fabrics, however, are difficult to work with because while they are very drapeable, they do not have good stability. When working around an edge or a corner, the fabric will tend to thin and even split due to the long floats, which create large areas of unidirectional filaments.

A similar sheet of woven fabric is used to create prepreg 502, which is used in component 101. However, for that fabric a thinner tow is used for the warps and wefts, leading to an area density of 200 g/m$^2$.

Figure 7:
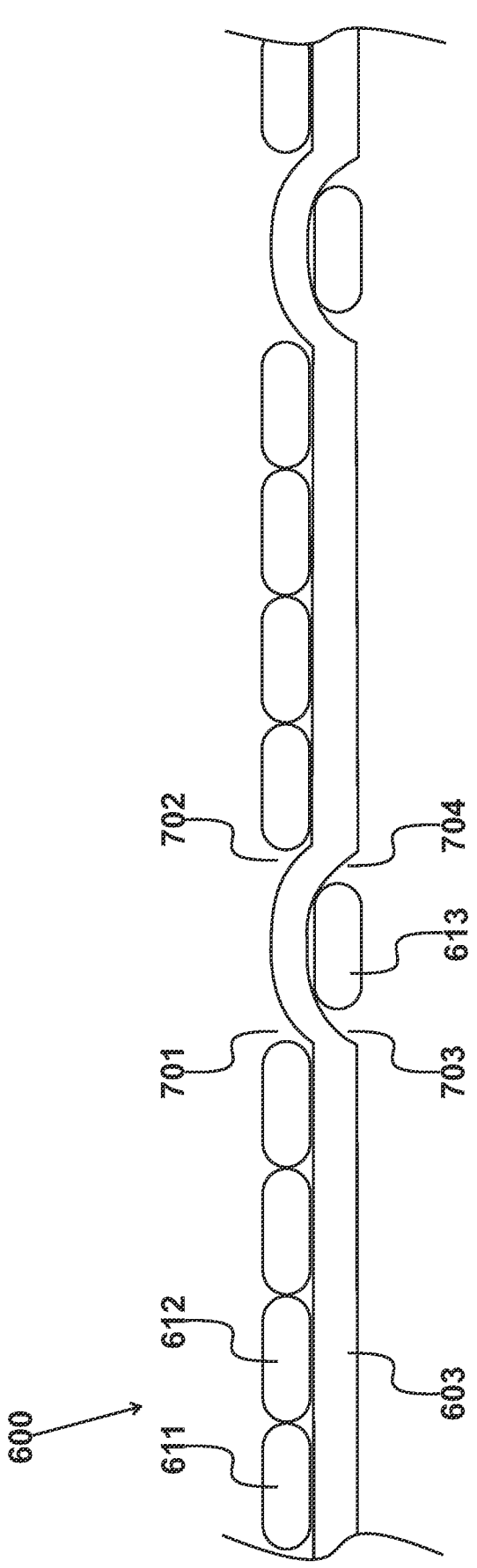
FIG. 7 is a diagrammatic cross-section along a line shown in FIG. 6.

FIG. 7 shows a cross-section of part of fabric 600 along the line A-A shown in FIG. 6. Weft 603 passes under four warps, including warps 611 and 612, before passing over a single warp 613. This is repeated across the whole fabric. If a cross-section were shown in the orthogonal direction it would have the same layout but upside-down, with a warp passing over four wefts and over one. Therefore, the fabric has long parallel floats on both sides, with those on one side being orthogonal to those on the other side. In FIG. 7, warp 611 forms float 621 and warp 612 forms float 622.

In any woven fabric, crimping occurs where the weft passes over or under the warps, which leaves free space in the fabric. There is some free space between the adjacent tows, but crimping creates even more. For example, there is free space at 701, 702, 703 and 704 where weft 603 passes over warp 613. Typical prepregs use a twill weave, which provides a compromise between drape and strength, in which each weft goes under two warps and over two warps (as will be shown in FIG. 10). This results in a large amount of crimping, and therefore a large amount of free space. The crimping increases with the weight of the fibre tow, so a thicker fabric has relatively more free space. Some free space is enclosed within a single layer of fabric, and some enclosed free space is created between layers of prepregs when creating a laminate.

Ideally, all the enclosed free space in a prepreg fabric or laminate will eventually be filled with resin during the debulking and curing process. However, if a composite laminate stack is insufficiently debulked or consolidated, air will migrate to and be trapped in the enclosed free space leading to porosity and inclusions. Using a satin weave reduces the amount of crimping and therefore the amount of free space.

Each warp and weft is a bundle of carbon-fibre filaments. The tows are supplied for weaving in a flattened circle shape known as a ribbon, as can be seen in FIG. 7. The pre-impregnation process flattens the tows further which improves fibre packing. The long parallel floats of a satin weave make it easier for this flattening to occur, thereby further reducing the free space in the fabric.

However, as previously discussed, satin weave fabric is difficult to work with, and therefore users generally choose a twill weave fabric instead.

Figure 8:
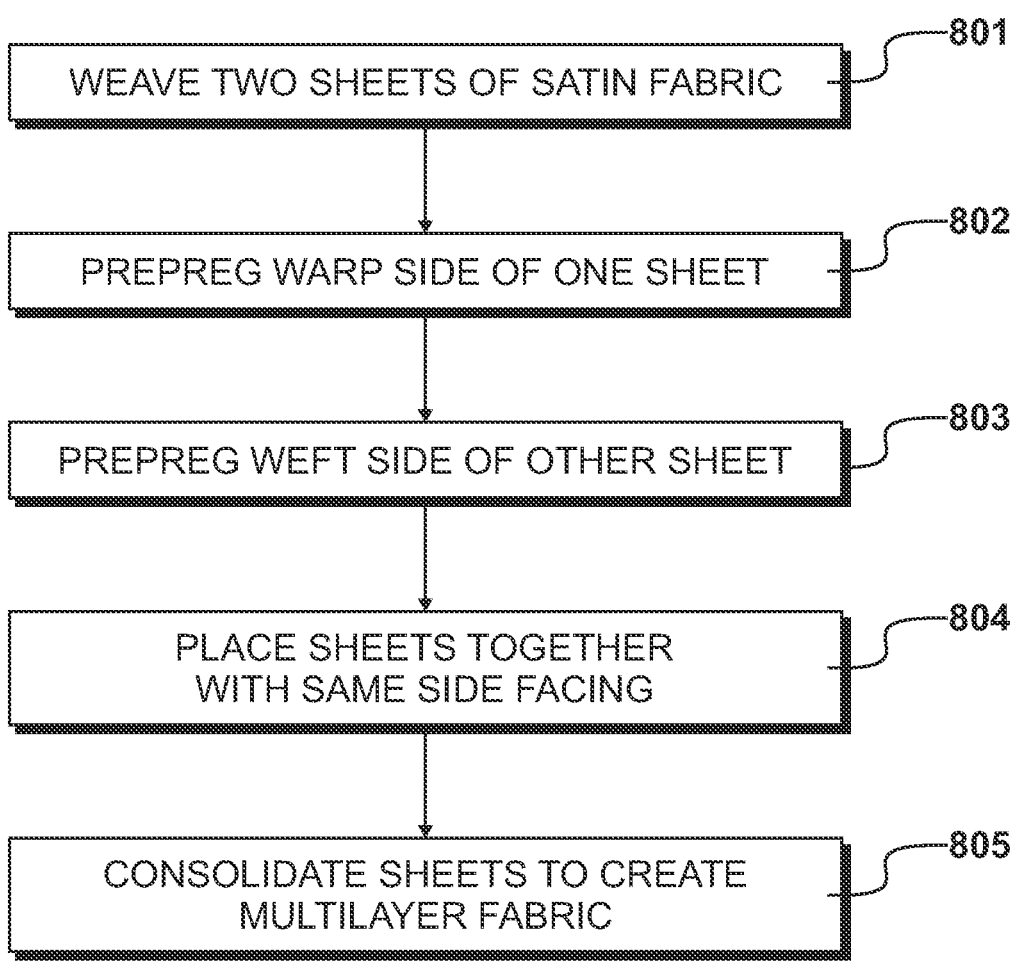
FIG. 8 details steps taken to create a multi-layer fabric prepreg forming part of the mould shown in FIG. 4.

FIG. 8 details steps in the process of creating the fabric prepreg 403 used for the bulk ply layers of mould 401 (such as layer 403) and the fabric 502 used for the prepreg layers of component 101.

At step 801, two sheets of satin weave fabric, such as sheet 600, are woven. These are substantially identical, woven using the same weight of tow of the same fibre, and in the same satin weave which in this example is five-harness.

The sheets are elongate, thereby having a longitudinal direction and/or extent. Preferably the sheets are provided wound as rolls, and each sheet may have a length of between 100 m to 200 m. However, it will be appreciated that other lengths may be considered such as between 50 m and 500 m.

The sheets may then be unrolled from their rolled state. Whilst being unrolled, the sheets are processed as per the below, with their longitudinal directions or extents aligned or substantially aligned. That is to say that, as the sheets are being unrolled, the unrolled portion of the sheets are aligned and run alongside each other and can be processed as per the below to allow continuous formation of the fabric prepreg 403.

The sheets are pre-impregnated with resin. In this embodiment the warp side of one sheet, i.e. the side on which the long floats of the warps are visible, is pre-impregnated at step 802. This can be done by the hot melt system, placing the warp side onto the resin paper. Under the heat and pressure of the rollers, the resin will be well consolidated into the warp side but there will be dry fibre left on the weft side. At step 803 the weft side of the other sheet is pre-impregnated.

At step 804 the two sheets are placed together with the weft sides facing, so that the long floats nest together. Because the sheets were pre-impregnated on different sides, the dry side of one sheet faces the resin side of the other sheet.

The two fabrics are then subjected to a secondary process of consolidation under heat and pressure at step 805. This process packs the fibres of the two sheets together, consolidates the resin throughout the remaining dry fibre, and adheres the two sheets together to create a single multi-layer fabric having an area density of 1020 g/m². This secondary consolidation process could be carried out by the same machine that pre-impregnates the sheets, or by a different machine.

Since sheets are elongate, the resulting fabric prepreg is also elongate. For ease of use, the fabric prepreg may then be cut into pieces, such as square sheets, via cutting transversely to a longitudinal direction. This may be done automatically and continuously on a conveyorised computer numerical control (CNC) machine.

Thus there is provided a woven fabric prepreg for constructing a composite laminate, comprising two sheets of fabric woven from tows of fibres, impregnated with a polymer matrix and adhered together. The sheets are woven in a satin weave such that the tows create long floats on at least one side. The sheets are positioned face-to-face with the long floats parallel, such that the tows pack together and the space between the sheets is minimised.

The two sheets could be placed with the warp sides facing instead of the weft sides. Alternatively, if the sheets are square, one sheet could be rotated by 90° and the sheets placed warp side to weft side so that the direction of the long floats is matched. In this case, it would be preferable to pre-impregnate the same side of each sheet.

As a further alternative, depending upon the method used for the secondary process of consolidation, either sheet could be pre-impregnated on the other side from that stated here, so that the sheets are placed with dry sides together or resin sides together.

Figure 9:
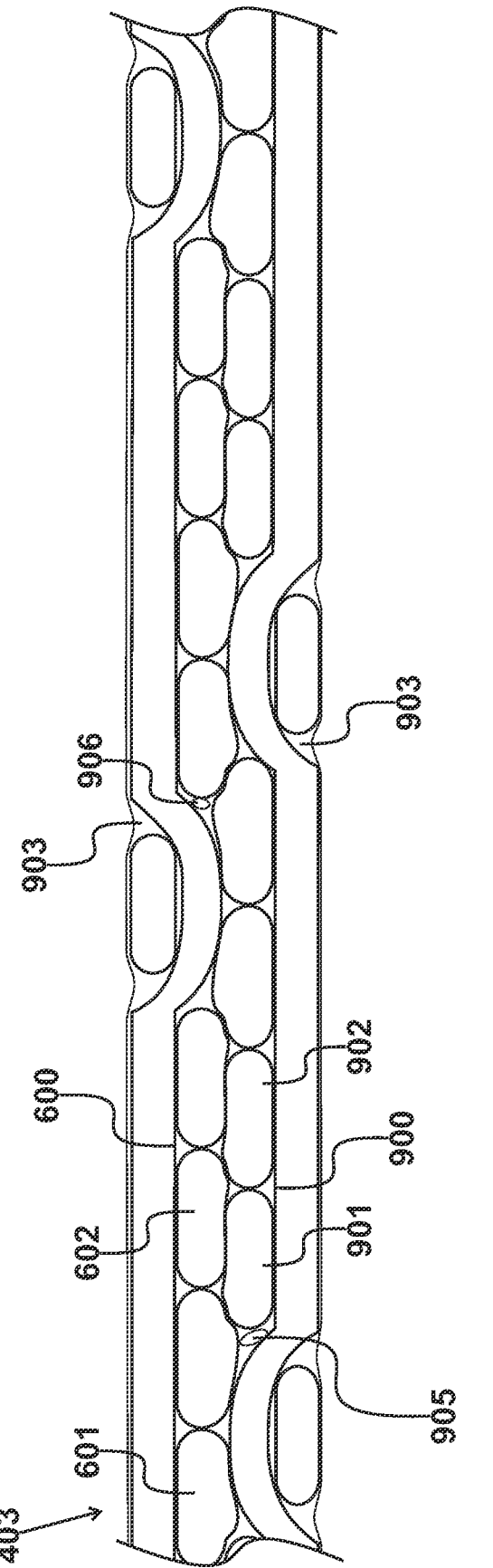
FIG. 9 is a diagrammatic cross-section of the multi-layer fabric prepreg forming part of the mould shown in FIG. 4.

FIG. 9 shows a diagrammatic cross section through bulk ply layer 403. It comprises two substantially identical woven sheets, sheet 600 and sheet 900, which have been consolidated to create a multi-layer fabric as described with reference to FIG. 8. Wefts, such as wefts 601 and 602, of sheet 600 are placed parallel to the warps, such as warps 901 and 902, of sheet 900. It is not necessary for them to be in the exact configuration shown in this Figure, only for the long floats to be parallel, i.e. running in the same direction. Resin 903 is consolidated throughout the two sheets, leaving only a few small pockets of air such as at 904 and 905.

The secondary process of consolidation not only consolidates the resin throughout both sheets 600 and 900 and adheres them together to create a single multi-layer fabric 403, it also improves fibre packing to reduce enclosed free space. As shown in FIG. 9, the long floats nest together under pressure, with the filaments of the tows spreading into the free space of the opposing sheet. It will be understood that FIG. 9 is a diagram of the fabric rather than an illustration; the actual fabric will have even less enclosed free space than that shown here.

Because fabric 403 is almost fully consolidated and has little enclosed free space, it requires less debulking than known prepregs. It is generally understood in the industry that debulking should take place after every addition of layers totalling an area density of around 1000 g/m². However, fabric 403, despite having an area density of 1020 g/m², requires less debulking. For example, debulking may only be required every three layers or more. This considerably speeds up the process of creating a laminate. Further, since each debulking procedure requires single-use items such as a vacuum bag and breather fabric or similar, using fabric 403 results in less waste.

Fabric 403, because it has a satin weave, is far more drapeable than known fabrics of the same weight. However, unlike known satin-weave fabrics, it has good stability and is easy to use. Further, the large areas of unidirectional fibres created by nesting the floats of the two sheets together result in a very strong laminate.

The same process described herein can be used to make a multi-layer satin-weave fabric of any area density. For example, by using a lighter-weight tow, the 400 g/m² prepreg 502 is created in the same way.

A fabric according to the invention could be manufactured using any weight of tow, any suitable fibre, and any suitable polymer matrix. A reasonable range for the area density of each sheet is between 60 g/m² and 1500 g/m², resulting in a possible range for the multi-layer bulk ply of between 120 g/m² and 3000 g/m².

In this embodiment the two sheets are adhered together by the polymer matrix, but in other embodiments an additional adhesive could be used, dependent on the method used to consolidate the sheets together.

Figure 10:
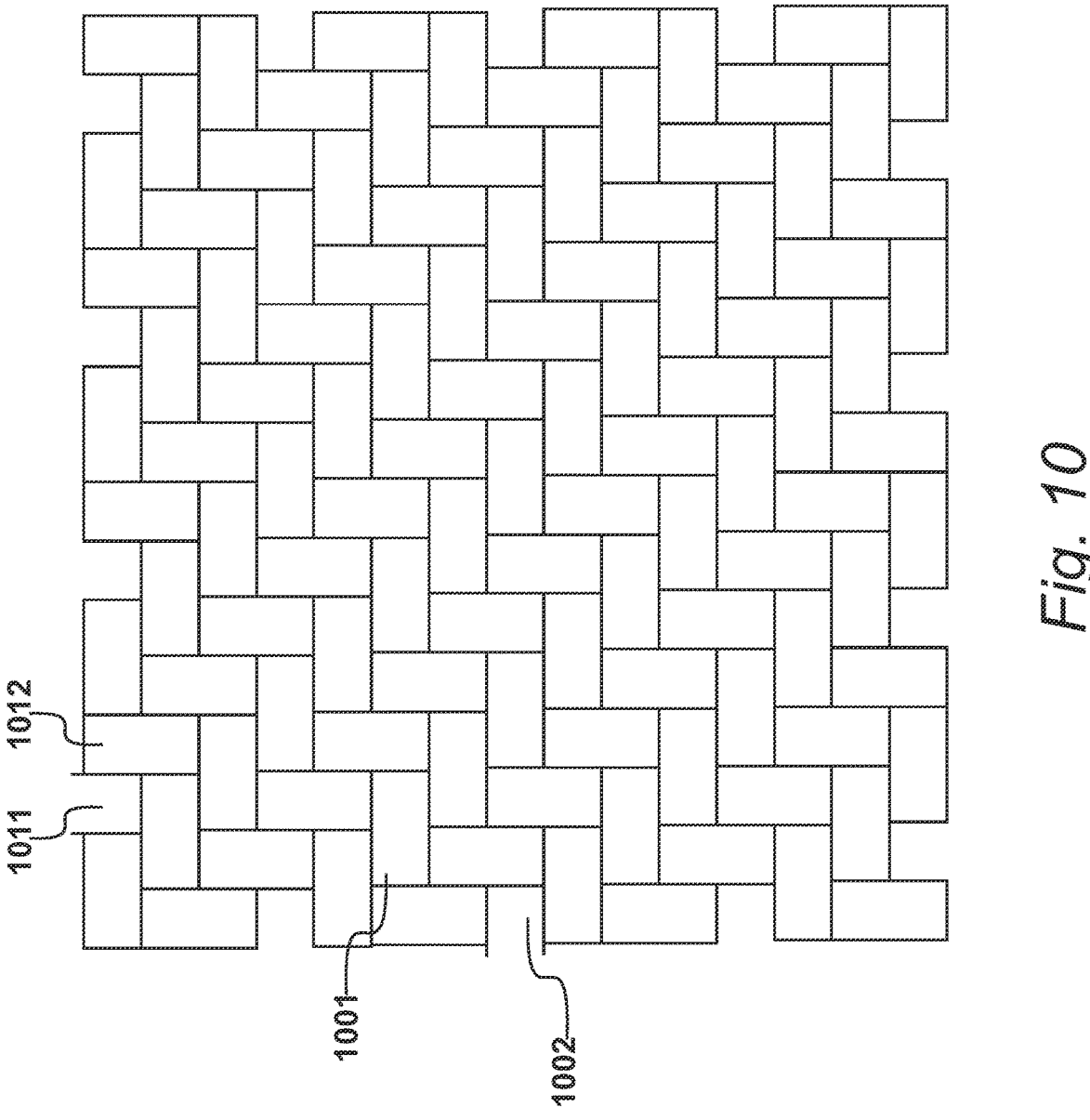
FIG. 10 shows a plan view of part of another fabric prepreg forming part of the mould shown in FIG. 4.

Part of surface ply prepreg 402 is shown in plan view in FIG. 10. This fabric is a twill weave, in which wefts such as weft 1001 and 1002 go over two warps and under two warps, such as warps 1011 and 1012. In order to create a fabric that requires little to no debulking, the enclosed free space in the fabric must be minimised. This is done by reducing the space between the tows and reducing the crimp. In surface ply 402, the 3K tows (i.e. tows having 3000 filaments) are spread out as much as possible to create a flat, smooth fabric. Because the tows are spread out they are very thin, and this minimises crimping. The fabric has an area density of 185 g/m², which is lighter than any previous surface ply.

Surface ply prepreg generally has an additional coating of resin on one side. This side is placed downwards on the pattern, and the additional resin creates a smoother inner surface of the mould.

With known prepregs, it is necessary to debulk after the first layer of surface ply to ensure that all the air is removed from it before a layer of bulk ply is added. Without this first debulking step, it is likely that there will be inclusions on the inner surface of the mould. However, surface ply 402 does not require debulking on its own because it contains very little enclosed free space. Bulk ply 403 can be used with known surface ply instead of prepreg 402, and in that case the surface ply would be likey to require an extra debulking step.

Typically, the surface ply used in a laminate would be made from the same fibre and polymer matrix as the bulk ply. As with the bulk ply herein described, any suitable fibre or matrix can be used.

Figure 11:
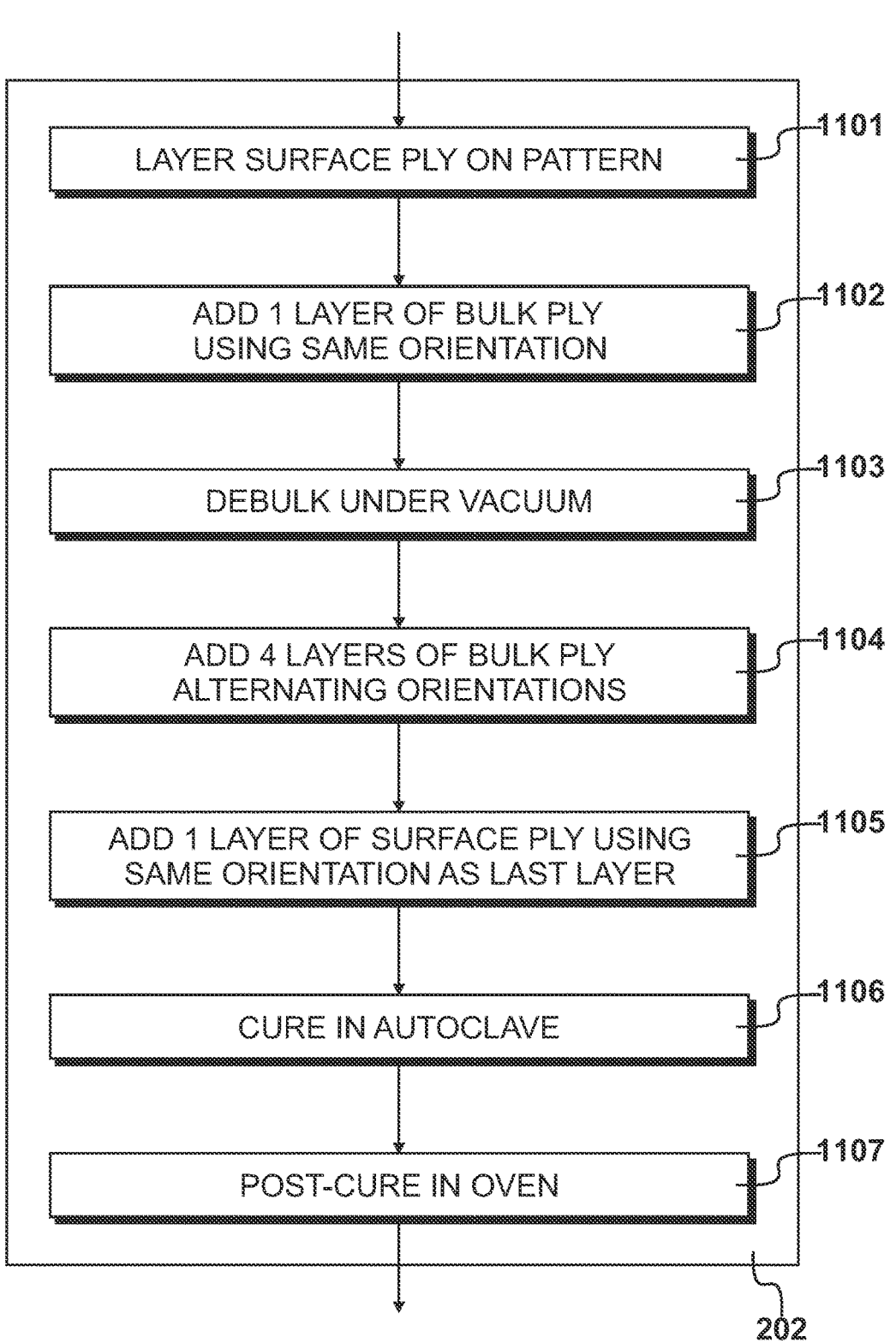
FIG. 11 details steps carried out during FIG. 2 to create a mould.

FIG. 11 details step 202 at which a tooling component such as mould 401 is constructed using fabrics 402 and 403.

At step 1101 a layer of surface ply 402 is placed onto pattern 301 and at step 1102 a first layer of bulk ply 403 is added having the same orientation. This means that the warp and weft of one fabric are parallel/orthogonal to the warp and weft of the other fabric. At step 1103 the laminate stack is debulked. It has been found that no further debulking subsequent to this step is required during addition of subsequent layers.

At step 1104 four further layers of bulk ply 403 are added, with alternating orientations, so that the warp and weft of each fabric is at around 45° to the warp and weft of the previous fabric. At step 1105 a final layer of surface ply 402 is added, having the same orientation as the first layer of surface ply. Constructing the laminate stack with these orientations ensures that the laminate is balanced, which improves strength.

The laminate is a 1:5:1 laminate, since there is a first surface layer 402, five bulk layers 403, and a second surface layer 402.

The laminate stack is then cured in an autoclave at step 1106, before being post-cured in an oven at step 1107.

A known tooling component may comprise one layer of thin surface ply having a weight of between 193 g/m² and 205 g/m², eight layers of thicker bulk ply having a weight of between 625 g/m² and 680 g/m², followed by a final layer of surface ply. It will need debulking after the first layer of surface ply and after every two layers of bulk ply, i.e., four times. However, for mould 401 constructed using the fabrics 402 and 403 described herein, only one debulking procedure is required.

By requiring fewer layers and less debulking, the time taken to construct mould 401 is half the time taken to construct a known tooling component.

Figure 12:
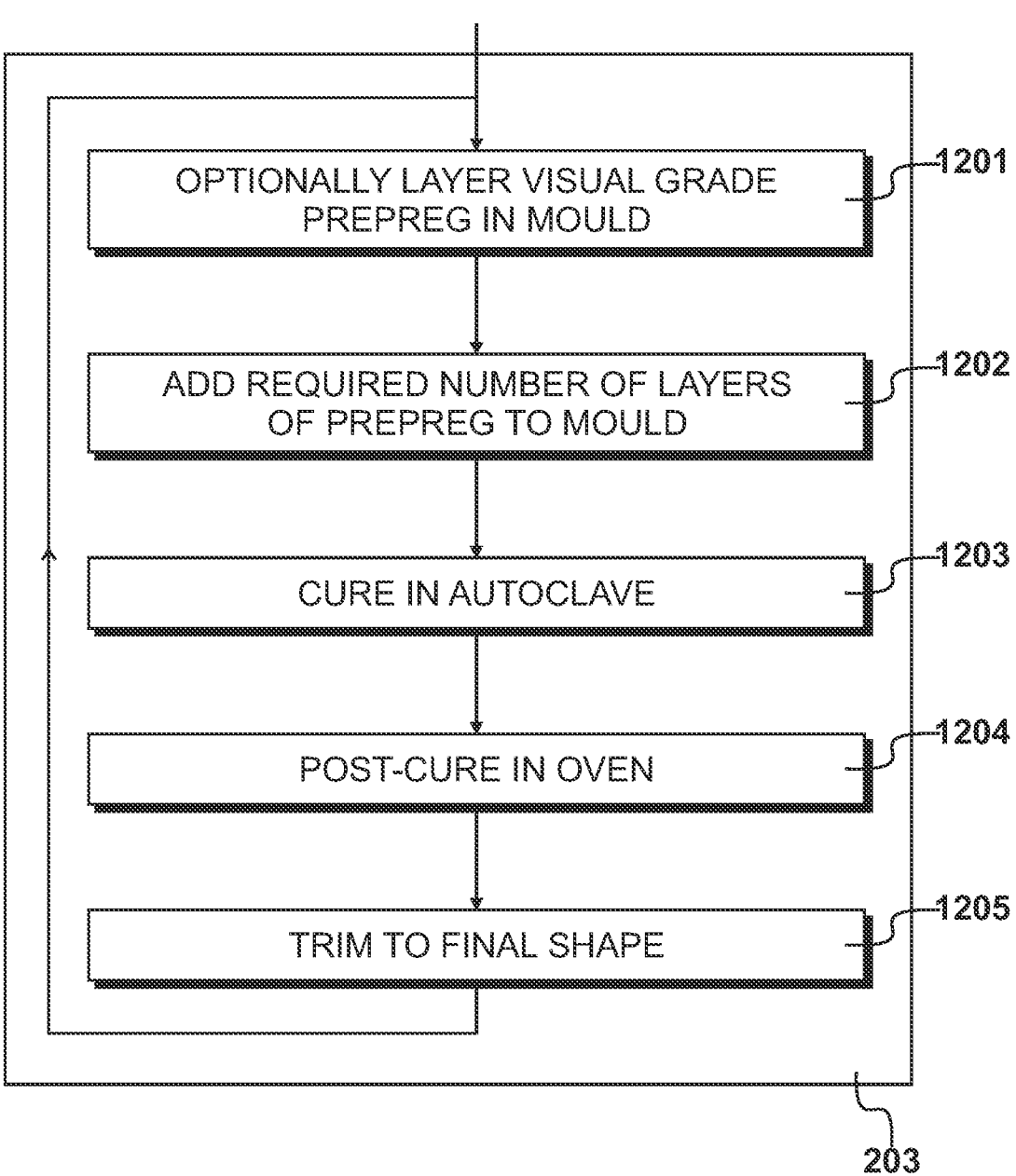
FIG. 12 details steps carried out during FIG. 2 to create components.

FIG. 12 details step 203 at which a plurality of components such as component 101 is constructed using mould 401.

At step 1201 a visual grade prepreg may be layered in the mould, depending on the finish required on the component. At step 1202 the required number of layers of component prepreg 502 are added. At step 1203 the component is cured in an autoclave and at step 1204 it is post-cured in an oven. At step 1205 it is trimmed to its final shape, such as by machining. Step 203 is repeated until the required number of components have been made, or until mould 401 cannot be used any more.

A final component, such as component 101, usually has fewer layers in its laminate than a tooling component, but still requires debulking when using known prepregs. A component having three layers of 400 g/m² prepreg would typically require two debulking procedures; however using the multi-layer fabric described herein only one debulking procedure is required, or perhaps even no debulking at all.

The invention claimed is:

1. A method of manufacturing a woven multi-layer fabric prepreg for use in constructing a composite laminate, comprising the steps of:

provding two sheets of woven fabric having tows of fibres in a satin weave, such that said tows create long floats on each side of each sheet, each sheet being elongate and having a longitudinal direction;

impregnating each sheet of fabric with a polymer matrix, wherein only a face of one of said sheets is impregnated with the polymer matrix and only a back of the other of said sheets is impregnated with the polymer matrix, the face having long floats aligned with the longitudinal direction and the back having long floats aligned in a direction orthogonal to the longitudinal direction;

placing the sheets together in any one of:

face-to-face, so that there is only a single layer of polymer matrix between the faces, and back-to-back, so that there is only a single layer of polymer matrix between the backs, with the long floats parallel, such that the tows pack together and enclosed free space between the sheets is minimised, and so that the longitudinal directions are aligned; and adhering said sheets together to form the woven multi-layer fabric prepreg.

2. The method of manufacturing a woven multi-layer fabric prepreg as claimed in claim 1, further comprising cutting the woven multi-layer fabric prepreg into pieces.

3. The method of manufacturing a woven multi-layer fabric prepreg as claimed in claim 2, wherein the woven multi-layer fabric prepreg is elongate and said cutting occurs in a direction transverse to a longitudinal direction of the woven multi-layer fabric prepreg.

4. The method of manufacturing a woven multi-layer fabric prepreg as claimed in claim 1, wherein at least one of the two sheets of fabric is provided on a roll.

5. The method of manufacturing a woven multi-layer fabric prepreg as claimed in claim 1, wherein at least one of the two sheets of fabric is greater than 100 m long.

6. The method of manufacturing a woven multi-layer fabric prepreg as claimed in claim 1, wherein each sheet has a fabric weight of over 500 gsm so that the woven multi-layer fabric prepreg has a fabric weight of over 1000 gsm.

7. The method of manufacturing a woven multi-layer fabric prepreg as claimed in claim 1, wherein each sheet has a fabric weight of between 500 gsm and 525 gsm so that the woven multi-layer fabric prepreg has a fabric weight of between 1000 and 1050 gsm.

8. The method of manufacturing a woven multi-layer fabric prepreg as claimed in claim 1, wherein the satin weave is any one of a four, five, and eight harness satin weave.

9. A method of manufacturing a composite laminate, comprising the steps of:

obtaining a pattern or a mould;

obtaining a first woven multi-layer fabric prepreg manufactured using the method of claim 1;

creating a laminate by placing a plurality of layers of said first fabric prepreg onto said pattern or into said mould; and curing said laminate using heat.

10. The method of manufacturing a composite laminate according to claim 9, further comprising the step of:

obtaining a second woven fabric prepreg, said second
fabric prepreg having a lower fabric weight than said
first fabric prepreg;
and wherein said step of creating a laminate further
comprises the step of placing a layer of said second
fabric prepreg before said layers of said first fabric
prepreg.

11. The method of manufacturing a composite laminate
according to claim 10, wherein a single debulking occurs
after placement of the second fabric prepreg and one layer
of the first fabric prepreg.

12. The method of manufacturing a composite laminate
according to claim 10, further comprising the step of placing
a further layer of said second fabric prepreg after said layers
of said first fabric prepreg.

13. The method of manufacturing a composite laminate
according to claim 9 wherein there are an odd number of
layers of the first fabric prepreg.

14. The method of manufacturing a composite laminate
according to claim 13 wherein there are five layers of the
first fabric prepreg.

15. The method of manufacturing a composite laminate
according to claim 9, wherein said layers of said first fabric
prepreg are placed such that the tows of adjacent layers are
neither parallel nor orthogonal to each other.

* * * * *